United States Patent [19]
Plamper

[11] 3,720,294
[45] March 13, 1973

[54] PAWL AND RATCHET MECHANISM
[75] Inventor: Gunter F. Plamper, Lakewood, Ohio
[73] Assignee: MTD Products Inc., Cleveland, Ohio
[22] Filed: July 7, 1971
[21] Appl. No.: 160,370

[52] U.S. Cl............................192/46, 192/50
[51] Int. Cl...............................F16d 41/12
[58] Field of Search............192/46, 50; 188/82.77

[56] References Cited

UNITED STATES PATENTS

| | | | |
|---|---|---|---|
| 305,697 | 9/1884 | Loud | 192/46 |
| 2,896,759 | 7/1959 | Huguenin | 192/46 |
| 3,620,337 | 11/1971 | Fluck | 192/46 |
| 675,360 | 5/1901 | Stevens | 192/50 |
| 1,020,417 | 3/1912 | Hartley | 192/50 |
| 1,406,211 | 2/1922 | Myers | 192/50 |

*Primary Examiner*—Allan D. Herrmann
*Attorney*—Woodling, Krost, Granger and Rust

[57] ABSTRACT

A pawl and ratchet mechanism for providing driving engagement between a driving member such as a tractor axle and a driven member such as a tractor wheel, wherein there is driving engagement upon rotation of the driving member in one circumferential direction and driving dis-engagement upon rotation of the driving member in an opposite circumferential direction. This is an abstract only of the specific illustration of the invention given by way of example, and is not to be used in the interpretation of the claims nor as a limitation on the scope of the invention.

8 Claims, 3 Drawing Figures

PATENTED MAR 13 1973

3,720,294

INVENTOR.
GUNTER F. PLAMPER

BY Woodling, Krost
Granger and Rust
ATTORNEYS.

PAWL AND RATCHET MECHANISM

An object of the invention is to provide an efficient and economical pawl and ratchet driving mechanism particularly adapted for such devices as tractors, power driven mowers, and other such devices wherein wheels are to be driven by power delivered through an axle or like rotative element.

Another object is the provision in a pawl and ratchet mechanism of dampening means for minimizing noise and chatter in the operation of the mechanism.

Another object is the provision in such a mechanism for resiliently urging the pawl toward a neutral position except upon rotation of the driving member in a driving circumferential direction.

Another object is the provision for providing unique and improved results not heretofore obtainable.

Other objects and a fuller understanding of this invention may be had by referring to the following description and claims, taken in conjunction with the accompanying drawings, in which:

FIG. 2 shows the mechanism with the pawl and ratchet arranged in driving engagement upon the driving member rotating in a driving direction of rotation;

Figure 1:
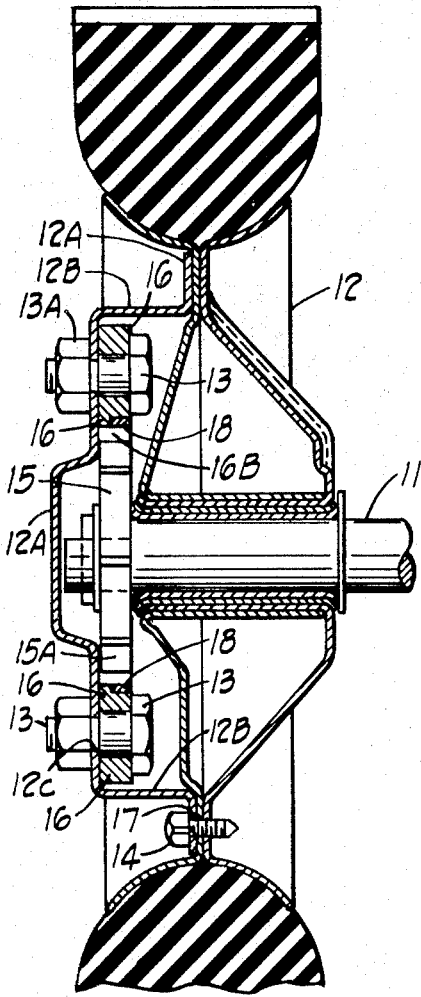
FIG. 1 is a vertical sectional view through a wheel to be driven mounted on driving axle and embodying my improved pawl and ratchet mechanism for operative interengagement of the wheel and axle, looking in the direction of the arrows 1—1 of FIG. 2.

In the preferred embodiment of my invention I show it mounted on the axle of a tractor, mower or other vehicle to provide a driving engagement with a wheel of the tractor, mower or other vehicle. In the drawing the driving member is rotatable such as by a motor of the vehicle. In the drawing of the embodiment the driving member is a rotatable axle 11 which is driven to be rotated in a first circumferential direction, such as in forward motion of the vehicle.

A driven member such as a wheel of the vehicle is concentrically mounted on the axle so as to be driven in a forward direction upon rotation of the axle in the driving circumferential direction. The wheel 12 illustrated is of the usual fabricated type of steel stampings welded and bolted together to form the wheel assembly 12 shown. A usual solid rubber tire is mounted on the outer rim of the wheel. The wheel or driven member 12 has an outer end plate 12A forming part of the wheel and which extends over across the axis of the wheel 12 and covers the end of the axle 11. This outer plate 12A has an outer ring or flange portion 12B integrally formed therewith whereby the outer plate 12A is cup-shaped in conformation. The outermost flange portion of the plate 12A is provided with four holes 17 which accommodate four bolts 14, respectively, which secure the plate 12A of the wheel to the rest of the wheel assembly.

Extending through the end wall of the outer plate 12A are three bolts 13 which are secured thereto by nuts 13A threaded on the respective bolts 13.

These bolts 13 provide pivotal mounting for a pair of pawls 16 disposed on diametrically opposite sides of the axis of the wheel 12 at axle 11. Each of the two bolts 13 is so positioned in openings extending through the pawls 16 that the pivot mounting provided by the bolts 13 is intermediate the ends of the respective pawls 16. The mounting is such that each pawl 16 may swing about the pivot mounting provided by its respective bolt 13.

Figure 2:
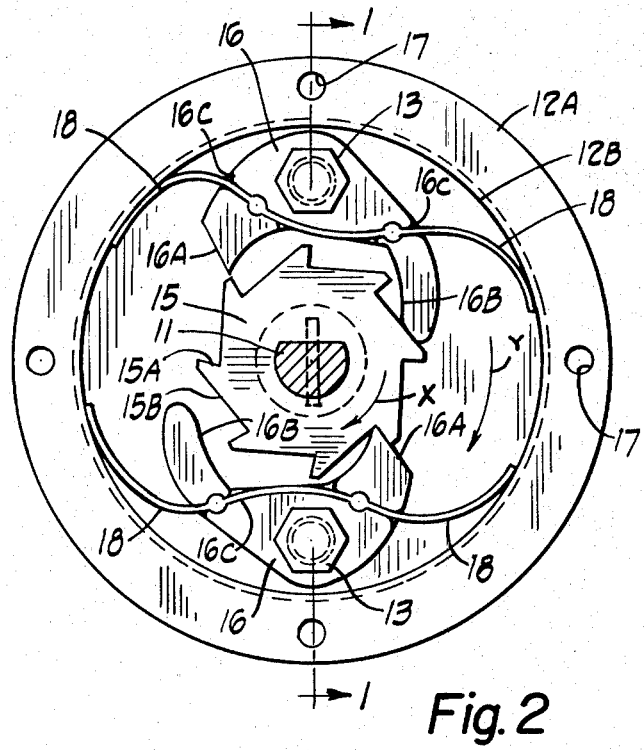
FIG. 2 is a sectional view taken normally of the axis of the wheel and axle in FIG. 1 looking to the left in FIG. 1, with the outside plate of the wheel removed from the wheel to better show the pawl and ratchet assembly.

Each pawl 16 has a dog portion 16A at one end and a follower portion 16B at its other end. The distribution of the mass in each pawl is such that weight of the follower portion 16B is heavier than that of dog portion 16A. In other words, when the pawls 16 are in the position illustrated in FIG. 2, the gravity pull on the follower portion 16B is greater than that on the dog portion 16A. The pawls will assume the attitudes illustrated in FIG. 2 when in that location and the shaft 11 is rotated in the direction of the arrow X, that is driven forwardly. It is to be noted that the dog portion 16A has an abrupt end face which because it provides for driving engagement may be referred to as a driving face of the pawl.

The follower portion 16B has a long sloping camming surface as illustrated on the side directed toward the axis of the wheel and axle.

There is a groove 16C extending across one side of each pawl 16 as shown in the drawing. This groove accommodates a resilient strap 18 which extends across a pawl 16 in the groove 16C and extends outwardly beyond the same to frictionally engage the ring portion 12B of the wheel plate 12A. There are enlarged knobs or portions on each strap 18 which fit into enlarged recesses or portions of the groove 16C whereby to lock the strap 18 in position. The extension of each strap 18 outwardly from its respective pawl 16 is substantially equal on opposite sides of the pawl 16. The resilient strap 18 is made of a resilient plastic or rubber-like material in the nature of a yieldable leaf spring whereby the outer ends of each strap member 18 may resiliently yield. The opposite ends of each strap member 18 press outwardly against the ring portion 12B and thus the strap member 18 tends to urge the pawl 16 in a neutral position, that is so that the urging radially inward of the dog portion 16A and the follower portion 16B is substantially the same, except that there is somewhat more resilient urging of the dog portion 16A toward the axis of the wheel than is the follower portion 16B urged radially inward. Thus, other things being equal, the dog portion 16A tends to be urged inward toward the axis of the wheel.

A ratchet wheel 15 having the conformation indicated is splined or keyed to the shaft 11 so as to be non-rotatably secured thereto. The ratchet wheel 15 has eight teeth protruding therefrom in the usual manner, which teeth are inclined as shown so as to present an abrupt driving face 15A and an inclined camming face 15B in the manner illustrated.

Upon rotation of the shaft 11, such as by the driving of a motor or engine, in the circumferential direction of the arrow indicated by reference character X, the ratchet wheel 15 turns in a corresponding circumferential direction. Upon the abrupt face 15A of a tooth engaging the dog portion 16A of one of the pawls 16, then the wheel is driven in a corresponding circumferential direction indicated by the arrow marked with the reference character Y. Thus, upon rotation of the driving member or axle 11 in a driving direction the wheel 12 is correspondingly rotated and driven.

Figure 3:
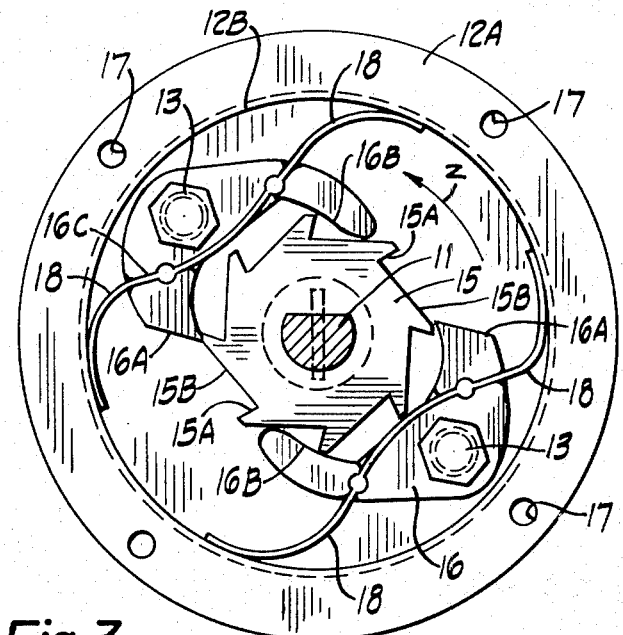
FIG. 3 is similar to that of FIG. 2 but with the pawl and ratchet arranged in non-driving engagement upon the driving member not rotating in a driving direction of rotation.

Upon the axle or driving member 11 along with the ratchet wheel 15 being idle or rotated in a circumferential direction opposite of that indicated by the arrow X, then the wheel 12 is free-wheeling and may rotate in the circumferential direction indicated by the arrow marked with the reference character Z in FIG. 3. Thus, in the absence of a rotative force on the axle 11 in a driving direction, as in FIG. 2, the pawls 16 become dis-engaged from the ratchet wheel 15 and the wheel 12 may freely rotate in the counter-clockwise direction marked by the arrow Z in FIG. 3. The inner faces of the pawls 16 facing the ratchet wheel 15 are cammingly engaged by the teeth of the ratchet wheel 15 and move the dog portion 16A out of engaging position so as not to drivingly engage with the ratchet wheel 15. The resilient yieldability of the strap member 18 is such as to accommodate for this thrusting aside or cammingly moving out of the way the pawls 16. However, the resiliency of the strap member 18 is such that the dog portion 16A is resiliently urged inwardly, in addition to the bias inward provided by the heavier follower portion 16B as previously explained, so as to be poised for driving engagement with the ratchet wheel 15 just as soon as the axle 11 and ratchet wheel 15 commence to turn in a driving direction, that is in the direction of the arrow indicated by the reference character X in FIG. 2.

It is also to be noted that the strap members 18 provide a dampening effect whereby the pawls 16 are prevented from chattering or hunting back and forth between extreme positions. Thus the strap members perform the several functions of providing a dampening effect which retards rapid movement of the pawls, of tending to urge the pawls in a general balanced or equilibrium position rather than extreme positions of in or out of engagement with the ratchet wheel 15, and of providing a small but sufficient resilient urging of the pawls 16 into position whereby the dog portions 16A of each pawl 16 are urged into driving engagement with an abrupt face 15A of the teeth of ratchet wheel 15. When it is indicated that the pawls are held in substantial equilibrium, this is intended to convey the thought that the pawls are urged away from extreme positions by the strap members 18 engaging the ring portion 12B, but on the other hand there is enough imbalance in the resilient urging of each strap member 18 whereby the dog portion 16A is slightly urged inwardly a sufficient degree to drivingly engage the ratchet wheel 15 upon the ratchet wheel being rotated in a circumferential driving direction, as indicated by the arrow X so as to almost immediately cause driving engagement between the ratchet wheel 15 and the wheel 12 upon the driving member or axle 11 being driven in a driving circumferential direction.

By the unique arrangement and proportioning of the parts as shown and described, there is provided a very useful pawl and ratchet drive mechanism which is rugged and efficient in operation and provides an economical driving mechanism in such vehicles as small tractors, mowers or other motor driven vehicles.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a pawl-type clutch mechanism for providing a clutching interengagement between a driving ratchet wheel and a rotatable driven member, said ratchet wheel being non-rotatably concentrically mounted on a rotatable driving member, said ratchet wheel having teeth inclined in one circumferential direction to present on each an abrupt engaging face and an inclined camming face, a pawl member pivotally mounted on said driven member at a side of the ratchet wheel in cooperative pawl-and-ratchet relationship, said pawl member having a dog portion on one end and a follower portion on its other end, said dog portion and follower portion being swingable in opposite directions toward and away from said ratchet wheel about the pivot mounting of said pawl member, said dog portion being clutchingly engageable with an abrupt engaging face of a said tooth upon rotation of the driving member in one direction to provide driving engagement between the driving member and driven member, said dog portion being slidably engageable with an inclined camming face of a said tooth upon rotation of the driving member in an opposite direction to permit rotation of the driven member relative to the driving member, said follower portion being slidably engageable with the said inclined camming surface of a tooth upon rotation of the driving member in said opposite direction, the sliding engagement of said follower portion to the peak of the respective tooth engaged thereby upon rotation of the ratchet wheel in said opposite direction pivotally swinging said pawl to move the dog portion thereof toward the ratchet wheel to a position to engage an abrupt engaging face of a tooth of the ratchet wheel to drivingly engage the same upon rotation of the driving member in said one direction, and a dampening device to dampen and resiliently resist rapid pivotal swinging of said pawl member.

2. In combination, a pawl-type clutch mechanism for providing a clutching interengagement between a driving ratchet wheel and a rotatable driven member, said ratchet wheel being non-rotatably concentrically mounted on a rotatable driving member, said ratchet wheel having teeth inclined in one circumferential direction to present on each an abrupt engaging face and an inclined camming face, a pawl member pivotally mounted on said driven member at a side of the ratchet wheel in cooperative pawl-and-ratchet relationship, said pawl member having a dog portion on one end and a follower portion on its other end, said dog portion and follower portion being swingable in opposite directions toward and away from said ratchet wheel about the pivot mounting of said pawl member, said dog portion being clutchingly engageable with an abrupt engaging face of a said tooth upon rotation of the driving member in one direction to provide driving engagement between the driving member and driven member, said dog portion being slidably engageable with an inclined camming face of a said tooth upon rotation of the driving member in an opposite direction to permit rotation of the driven member relative to the driving member, said follower portion being slidably engageable with the said inclined camming surface of a tooth upon rotation of the driving member in said opposite direction, the sliding engagement of said follower portion to the peak of the respective tooth engaged thereby upon rotation of the ratchet wheel in said opposite direction pivotally swinging said pawl to move the dog portion thereof toward the ratchet wheel to a position to engage an abrupt engaging face of a tooth of the ratchet wheel to drivingly engage the same upon rotation of the driving member in said one direction, a resilient member engaging said pawl member and said driven member to provide a lag in the pivotal swinging of the pawl member and to cushion the movement of the dog portion and follower portion thereof into engagement with said ratchet wheel.

3. In combination, a pawl-type clutch mechanism for providing a clutching interengagement between a driving ratchet wheel and a rotatable driven member, said ratchet wheel being non-rotatably concentrically mounted on a rotatable driving member, said ratchet wheel having teeth inclined in one circumferential direction to present on each an abrupt engaging face and an inclined camming face, a pawl member pivotally mounted on said driven member at a side of the ratchet wheel in cooperative pawl-and-ratchet relationship, said pawl member having a dog portion on one end and a follower portion on its other end, said dog portion and follower portion being swingable in opposite directions toward and away from said ratchet wheel about the pivot mounting of said pawl member, said dog portion being clutchingly engageable with an abrupt engaging face of a said tooth upon rotation of the driving member in one direction to provide driving engagement between the driving member and driven member, said dog portion being slidably engageable with an inclined camming face of a said tooth upon rotation of the driving member in an opposite direction to permit rotation of the driven member relative to the driving member, said follower portion being slidably engageable with the said inclined camming surface of a tooth upon rotation of the driving member in said opposite direction, the sliding engagement of said follower portion to the peak of the respective tooth engaged thereby upon rotation of the ratchet wheel in said opposite direction pivotally swinging said pawl to move the dog portion thereof toward the ratchet wheel to a position to engage an abrupt engaging face of a tooth of the ratchet wheel to drivingly engage the same upon rotation of the driving member in said one direction, a resilient strap secured to said pawl member and engaging said driven member at spaced locations on opposite sides of the pivot mounting of said pawl member to yieldably resist pivotally swinging of the pawl member.

4. A pawl and ratchet wheel mechanism to provide driving engagement between a rotatable driving member and a rotatable driven member concentric therewith, said pawl being swingably carried by a pivot mounting on the driven member to a side of the axis thereof, said ratchet wheel being non-rotatably mounted on said driving member to rotate therewith and disposed at the common axis of the driving and driven member, said ratchet wheel having teeth inclined to be drivingly engaged by the pawl upon rotation of the driving member and ratchet wheel in one circumferential direction and to be drivingly dis-engaged by said pawl upon rotation of the driven member in an opposite circumferential direction, said pawl having a dog portion on one end and a follower portion on its opposite end, said ends being disposed relative to said pivot mounting of the pawl that the dog portion and follower portion swing in opposite directions toward and away from said ratchet wheel to engage therewith, said follower portion being arranged relative to the dog portion and to the ratchet wheel to permit the dog portion to drivingly dis-engage the ratchet wheel upon swinging of the follower portion toward the ratchet wheel and to permit the dog portion to be drivingly engaged by the ratchet wheel upon swinging of the follower portion away from the ratchet wheel, the said dog portion being cammingly moved by the teeth of the ratchet wheel out of driving engagement therewith upon rotation of the driven member in said opposite circumferential direction and said follower portion being cammingly moved by the teeth of the ratchet wheel to position the dog portion relative to the ratchet wheel ready for driving engagement therewith upon rotation of the driving member and ratchet wheel in said one circumferential direction, dampening means between the pawl and driven member to dampen the swinging movement of the pawl relative to the driven member.

5. A pawl and ratchet wheel mechanism to provide driving engagement between a rotatable driving member and a rotatable driven member concentric therewith, said pawl being swingably carried by a pivot mounting on the driven member to a side of the axis thereof, said ratchet wheel being non-rotatably mounted on said driving member to rotate therewith and disposed at the common axis of the driving and driven member, said ratchet wheel having teeth inclined to be drivingly engaged by the pawl upon rotation of the driving member and ratchet wheel in one circumferential direction and to be drivingly dis-engaged by said pawl upon rotation of the driven member in an opposite circumferential direction, said pawl having a dog portion on one end and a follower portion on its opposite end, said ends being disposed relative to said pivot mounting of the pawl that the dog portion and follower portion swing in opposite directions toward and away from said ratchet wheel to engage therewith, said follower portion being arranged relative to the dog portion and to the ratchet wheel to permit the dog portion to drivingly dis-engage the ratchet wheel upon swinging of the follower portion toward the ratchet wheel and to permit the dog portion to be drivingly engaged by the ratchet wheel upon swinging of the follower portion away from the ratchet wheel, the said dog portion being cammingly moved by the teeth of the ratchet wheel out of driving engagement therewith upon rotation of the driven member in said opposite circumferential direction and said follower portion being cammingly moved by the teeth of the ratchet wheel to position the dog portion relative to the ratchet wheel ready for driving engagement therewith upon rotation of the driving member and ratchet wheel in said one circumferential direction, a resilient strap carried by the pawl and extending from opposite sides of the pivotal mounting therefrom to engagement with the driven member on opposite sides of the pawl to resiliently resist pivotal swinging of the pawl.

6. A pawl and ratchet wheel mechanism to provide driving engagement between a rotatable driving member and a rotatable driven member concentric therewith, said pawl being swingably carried by a pivot mounting on the driven member to a side of the axis thereof, said ratchet wheel being non-rotatably mounted on said driving member to rotate therewith and disposed at the common axis of the driving and driven member, said ratchet wheel having teeth inclined to be drivingly engaged by the pawl upon rotation of the driving member and ratchet wheel in one circumferential direction and to be drivingly dis-engaged by said pawl upon rotation of the driven member in an opposite circumferential direction, said pawl having a dog portion on one end and a follower portion on its opposite end, said ends being disposed relative to said pivot mounting of the pawl that the dog portion and follower portion swing in opposite directions toward and away from said ratchet wheel to engage therewith, said follower portion being arranged relative to the dog portion and to the ratchet wheel to permit the dog portion to drivingly dis-engage the ratchet wheel upon swinging of the follower portion toward the ratchet wheel and to permit the dog portion to be drivingly engaged by the ratchet wheel upon swinging of the follower portion away from the ratchet wheel, the said dog portion being cammingly moved by the teeth of the ratchet wheel out of driving engagement therewith upon rotation of the driven member in said opposite circumferential direction and said follower portion being cammingly moved by the teeth of the ratchet wheel to position the dog portion relative to the ratchet wheel ready for driving engagement therewith upon rotation of the driving member and ratchet wheel in said one circumferential direction, a resilient strap operatively engaging the pawl and driven member to urge the pawl into a neutral position poised ready for driving engagement with the ratchet wheel upon rotation of the driving member in said one circumferential direction and for dis-engagement with the ratchet wheel upon rotation of the driven member in said opposite circumferential direction.

7. A pawl and ratchet wheel mechanism to provide driving engagement between a rotatable driving member and a rotatable driven member concentric therewith, said pawl being swingably carried by a pivot mounting on the driven member to a side of the axis thereof, said ratchet wheel being non-rotatably mounted on said driving member to rotate therewith and disposed at the common axis of the driving and driven member, said ratchet wheel having teeth inclined to be drivingly engaged by the pawl upon rotation of the driving member and ratchet wheel in one circumferential direction and to be drivingly dis-engaged by said pawl upon rotation of the driven member in an opposite circumferential direction, said pawl having a dog portion on one end and a follower portion on its opposite end, said ends being disposed relative to said pivot mounting of the pawl that the dog portion and follower portion swing in opposite directions toward and away from said ratchet wheel to engage therewith, said follower portion being arranged relative to the dog portion and to the ratchet wheel to permit the dog portion to drivingly dis-engage the ratchet wheel upon swinging of the follower portion toward the ratchet wheel and to permit the dog portion to be drivingly engaged by the ratchet wheel upon swinging of the follower portion away from the ratchet wheel, the said dog portion being cammingly moved by the teeth of the ratchet wheel out of driving engagement therewith upon rotation of the driven member in said opposite circumferential direction and said follower portion being cammingly moved by the teeth of the ratchet wheel to position the dog portion relative to the ratchet wheel ready for driving engagement therewith upon rotation of the driving member and ratchet wheel in said one circumferential direction, resilient biasing means yieldably urging the pawl into position to cause the dog portion to drivingly engage the ratchet wheel upon rotation of the driving member in said driving circumferential direction.

8. A pawl and ratchet wheel mechanism to provide driving engagement between a rotatable driving member and a rotatable driven member concentric therewith, said pawl being swingably carried by a pivot mounting on the driven member to a side of the axis thereof, said ratchet wheel being non-rotatably mounted on said driving member to rotate therewith and disposed at the common axis of the driving and driven member, said ratchet wheel having teeth inclined to be drivingly engaged by the pawl upon rotation of the driving member and ratchet wheel in one circumferential direction and to be drivingly dis-engaged by said pawl upon rotation of the driven member in an opposite circumferential direction, said pawl having a dog portion on one end and a follower portion on its opposite end, said ends being disposed relative to said pivot mounting of the pawl that the dog portion and follower portion swing in opposite directions toward and away from said ratchet wheel to engage therewith, said follower portion being arranged relative to the dog portion and to the ratchet wheel to permit the dog portion to drivingly dis-engage the ratchet wheel upon swinging of the follower portion toward the ratchet wheel and to permit the dog portion to be drivingly engaged by the ratchet wheel upon swinging of the follower portion away from the ratchet wheel, the said dog portion being cammingly moved by the teeth of the ratchet wheel out of driving engagement therewith upon rotation of the driven member in said opposite circumferential direction and said follower portion being cammingly moved by the teeth of the ratchet wheel to position the dog portion relative to the ratchet wheel ready for driving engagement therewith upon rotation of the driving member and ratchet wheel in said one circumferential direction, means for resiliently dampening movement of the pawl so as to minimize noise, and for resiliently urging the pawl into a neutral position upon rotation of the driving member in a non-driving circumferential direction and into a driving engagement with the ratchet wheel upon rotation of the driving member in a driving circumferential direction.

* * * * *